United States Patent [19]

Fletcher, Jr. et al.

[11] 4,079,834
[45] Mar. 21, 1978

[54] CONVEYOR PROVIDED WITH AN ENDLESS BELT TENSIONING MECHANISM

[75] Inventors: Stacy G. Fletcher, Jr., New Holland; Joel D. McCorkel, Leola, both of Pa.

[73] Assignee: Aggregates Equipment, Inc., Leola, Pa.

[21] Appl. No.: 655,727

[22] Filed: Feb. 6, 1976

[51] Int. Cl.² .............................................. B65G 29/00
[52] U.S. Cl. .................... 198/810; 198/816; 226/25; 226/44
[58] Field of Search ............... 198/208, 813, 810, 816, 198/502; 74/242.9, 242.11 R, 242.11 C, 242.13 A; 226/25, 44; 318/6; 212/39 R

[56] References Cited

U.S. PATENT DOCUMENTS

| | | | |
|---|---|---|---|
| 2,244,033 | 6/1941 | Trempe | 198/813 X |
| 2,782,902 | 2/1957 | Sloane | 198/810 |
| 2,846,054 | 8/1958 | Bergmann | 198/810 X |
| 3,027,993 | 4/1962 | Houben | 198/810 |
| 3,045,360 | 7/1962 | Alexeff et al. | 226/44 X |
| 3,217,863 | 11/1965 | Duncan | 198/810 |
| 3,675,482 | 7/1972 | Hewitt | 198/813 X |
| 3,923,151 | 12/1975 | Weber | 198/813 X |

*Primary Examiner*—John J. Love
*Assistant Examiner*—Douglas D. Watts
*Attorney, Agent, or Firm*—John C. Thompson

[57] ABSTRACT

An endless belt conveyor provided with a tensioning mechanism which includes an idler in operative contact with the return run, the idler being supported by a movable carriage. Tension adjusting means are provided which may move the carriage and idler in either a first direction to increase the tension on the endless belt or in a second direction to reduce the tension for purposes of resplicing the belt. The tensioning mechanism further includes control means which senses the tension on the return run and which may initiate movement of the carriage in either direction. The means for sensing the tension includes a normally open limit switch which is adapted to close when the tension on the return run falls below a predetermined value. The means which may initiate movement of the carriage in the first direction include first means operable to energize the tension adjusting means a suitable time interval after the normally open limit switch has closed, and additional means which prevents operation of the tension adjusting means for an initial time interval during start-up of the conveyor. The control means further includes manually operable normally open contact means which, when closed, will permit the operation of the tension adjusting means to move the idler in the second direction. Selector means are provided which permit the operation of the tension adjusting means to move the idler in the first direction only when the drive for the conveyor is operative, said selector means further permitting operation of the tension adjusting means to move the idler in the second direction only when the conveyor drive means is inoperative. Limit switches are provided contactable by the carriage to prevent the carriage from moving too far in either its first direction or its second direction.

26 Claims, 8 Drawing Figures

CONVEYOR PROVIDED WITH AN ENDLESS BELT TENSIONING MECHANISM

FIELD OF THE INVENTION

The present invention relates generally to endless belt conveyors, and more specifically to an improved belt tensioning mechanism which will permit the tension of the belt to be increased only after the tension on the return run has fallen below a predetermined value for a preselected time interval, the means to increase the belt tension only being operative while the conveyor drive is operative, and furthermore not being operative during an initial time period during start-up of the conveyor drive. In addition, the tension adjusting means can be utilized to reduce the tension on the endless belt, but this is only possible when the conveyor drive is inoperative.

BACKGROUND OF THE INVENTION

It is necessary to provide tension adjusting means for endless belt conveyors as the tension on such endless belts will vary depending upon the elongation of the belts and the loading of the belts. If such tension adjusting means were not provided the tension on the belts would, in many situations, tend to decrease to a point where there would be insufficient frictional engagement between the drive pulley and the belt to prevent slippage or creeping of the belt which would in turn cause undesirable jerks in the belt movement and would also result in abnormal wear of the belt when the tension is not sufficient.

In the past weighted or gravity take-ups have been used on endless belt conveyor systems in open mines to maintain the tension on the slack side or return run of the endless belt. While these weighted take-ups perform in a generally satisfactory manner there are certain disadvantages to this form of take-up. Thus, after the belt has elongated to such a point that the weighted take-up can no longer adequately take-up the slack, it is necessary to raise the weight so that a section of the belt may be taken out, the remaining belt being respliced so that the conveyor belt will now operate properly again. As the weight may be quite heavy, as for example a ton, it is generally difficult to raise the weight. In addition, safety standards require that the weight be suspended in such a manner that workmen cannot pass beneath the weight in the event that the weight should suddenly descend, which might happen if the belt were to break. In many situations it is desirable to use the space beneath the weight, and therefore the utilization of a weighted take-up may be undesirable in the design of such equipment. Furthermore, it is necessary to support the weight of such a take-up, and therefore the employment of a gravity take-up requires the use of support frame members of a greater load carrying capacity adjacent the take-up.

U.S. Pat. No. 2,725,976 issued Dec. 6, 1955 to Madeira discloses a tensioning device for belt conveyors which does not utilize the conventionally employed weighted or gravity take-up. In Madeira an idler roller is mounted on a carriage which runs parallel to the runs of the belt, the idler roller being moved by a tensioning mechanism which includes a winch controlled by a limit switch which is responsive to the tension on the return run of the belt. While this design eliminates the foregoing problems of the weighted take-up, it has inherent disadvantages. Thus the tensioning mechanism will hunt during the initial start-up of the conveyor as the tension on the endless run will vary considerably during the initial start-up. In this regard, it should be noted that at start-up the loading on the belt will vary as the torque varies. Similarly, during start-up the belt initially stretches, and until the full length of the belt is stretched to normal operating conditions it is not possible to get a proper measure of the working tension at the idler location. Furthermore, after start-up, the tensioning mechanism of Madeira will cause the tension idler to be moved as soon as the tension at the idler falls below a predetermined point which may not be desirable as there are sometimes certain momentary decreases on the tension on the belt after start-up due to belt lash which is caused when heavy loads are either suddenly imposed on the conveyor or discharged from the conveyor. Similarly, it is possible for machine vibrations to cause the limit switch to give false signals.

Other designs have been developed such as U.S. Pat. No. 2,846,054 issued Aug. 5, 1958 to Bergmann and U.S. Pat. No. 2,853,933 issued Nov. 4, 1958 to Hardy. The Hardy patent discloses the utilization of a winch mechanism acting through a carriage mounted idler which is utilized to maintain the tension on a return run of an endless belt. When the tension either exceeds or falls below a predetermined value the winch is caused to be operated by a limit switch after a suitable time delay by utilization of a time delay relay 183. While this design overcomes some of the disadvantages of the design shown in the previously mentioned Madeira patent, the tensioning mechanism of this design will still hunt during the initial start-up of the conveyor system. In addition, the design shown in Hardy will permit the carriage which supports the idler roller to move too far in one direction or the other. Bergmann, which is an improvement patent over Hardy, discloses the utilization of a limit switch which will prevent the movement of the carriage too far in one direction. However, Bergmann does not disclose any means to limit the movement of the carriage which supports the roller in the other direction.

In addition, it is possible in the foregoing patented constructions to decrease the tension on the endless belt during operation of the conveyor. It has been found in practice that it is seldom necessary to decrease the tension during operation of the conveyor. By permitting the tension to be decreased during operation of the conveyor, if the operator of the conveyor inadvertantly causes the tension to be decreased, the tension may in fact be decreased to such a point that belt slippage and undue belt wear may occur. Where the load on the conveyor belt is being moved uphill, if the tension is reduced to such an extent that frictional contact between the drive pulley and the belt is lost, the conveyor belt may even run in the reverse direction permitting the load to be discharged at the wrong end of the belt.

U.S. Pat. 3,217,863 issued Nov. 16, 1965 to Duncan discloses an endless belt conveyor tensioning mechanism including a centrifugal switch 39 which is employed to prevent the tensioning mechanism from being operative when the belt speed falls below a predetermined value, which may be about 75% of the full speed of the conveyor. Such a device is only satisfactory when the conveyor belt is designed to operate at a single fixed speed. However, where the conveyor belt is designed to operate at varying speeds through the employment of a variable speed drive, such a device is not practical.

OBJECTS AND SUMMARY OF THE INVENTION

It is an object of the present invention to provide a tensioning mechanism for an endless belt conveyor wherein the tensioning mechanism is provided with first means operable when the tension falls below a predetermined value to permit increasing the tension on the endless belt only after a suitable time interval, and second means operable to initiate operation of the first means only after a suitable initial time interval has passed following the start-up of the conveyor drive means whereby the tension adjusting means will not operate until after the initial time interval to prevent hunting of the tensioning idler during start-up of the conveyor.

It is a further object of the present invention to provide a conveyor including a belt tensioning mechanism wherein the tensioning mechanism includes control means operative to permit energization of the tension adjusting means to either increase or decrease the tension on the endless belt and further including selector means which will permit the tension adjusting means to increase the tension only when the conveyor drive means is operative and to permit the tension to be decreased only when the conveyor drive is inoperative.

A further object of this invention is to provide an endless belt conveyor mechanism with belt tensioning means to increase the tension on the endless belt wherein the tensioning mechanism will not operate until after a suitable time interval after the tension falls below a predetermined value, the conveyor mechanism also including selector means which will permit the tension on the belt to be increased only when the conveyor drive means is operative.

An additional object of the present invention is to provide a conveyor mechanism wherein the tension may be increased or decreased on a conveyor belt, the mechanism which increases the tension on the belt not being operative until after a suitable time interval after the tension falls below a predetermined value, the conveyor mechanism further being provided with selector means which permit the tension to be increased on the belt only when the conveyor drive means is operative, and furthermore, which permits the tension to be decreased on the belt only when the conveyor drive is inoperative.

A still further object of the present invention is to provide a conveyor mechanism with an endless belt tensioning mechanism operative to increase the tension of the endless belt and a relay associated with the conveyor drive, the relay being provided with normally open contact means which will be closed during the operation of the conveyor drive means, the normally open contact means being associated with the control for the tension adjusting means whereby the tension adjusting means may not operate except when the conveyor drive means is operative.

Another object of the present invention is to provide a tensioning mechanism for an endless belt conveyor wherein the tensioning mechanism includes a carriage mounted on a frame and an idler carried by the carriage, tension adjusting means in the form of a screw mechanism extending between said frame and said carriage, and tension sensing means interconnected with said screw mechanism.

Another object of the present invention is to provide a tensioning mechanism for an endless belt conveyor wherein the tensioning mechanism includes an idler mounted on a carriage movable in opposed directions, and limit switches contactable by the carriage at the end of its movement in either the first or the second direction, said limit switches being interconnected with the means to move the carriage in such a manner that the carriage will not be moved after it has contacted the limit switches.

These and other objects and advantages of this invention will be apparent to those skilled in the art after a consideration of the following detailed description, taken in conjunction with the accompanying drawings in which a preferred form of this invention is illustrated. In summary, the invention is applied to an endless belt conveyor and includes a tensioning idler in operative contact with the return run of the endless belt, the idler being mounted on a movable carriage. Tension adjusting means in the form of an electrically operated screw mechanism may move the carriage in either a first direction to increase the tension on the endless belt or in a second direction to reduce the tension for the purpose of resplicing the belt. The invention further includes control means which includes means for sensing the tension on the return run and means for initiating movement of the carriage in either direction. The means for sensing the tension includes a U-shaped flexing beam and a normally open limit switch which is adapted to close when the tension on the return run falls below a predetermined level. The means which may initiate movement of the carriage in the first direction includes a first time delay relay which permits energization of the electrically operated screw mechanism a suitable time interval after the normally open limit switch means of the tension sensing means has closed, and a second time delay relay which prevents operation of the tension adjusting means during an initial time interval after start-up of the conveyor. The control means further includes manually operable normally open contact means which, when closed, will permit operation of the electrically operated screw mechanism to move the idler in the second direction. Selector means, including a relay interconnected with the conveyor drive, are provided which will permit the operation of the electrically operated screw adjusting means to move the idler in the first direction only when the drive for the conveyor is operative, said selector means further permitting operation of the electrically operated screw mechanism to move the idler in the second direction only when the conveyor drive means is inoperative. In addition limit switches are provided which are contactable by the carriage, the limit switches when contacted by the carriage causing contacts to the motor circuit for the electrically operated screw mechanism to become opened.

DETAILED DESCRIPTION OF A PREFERRED EMBODIMENT

Figure 1:
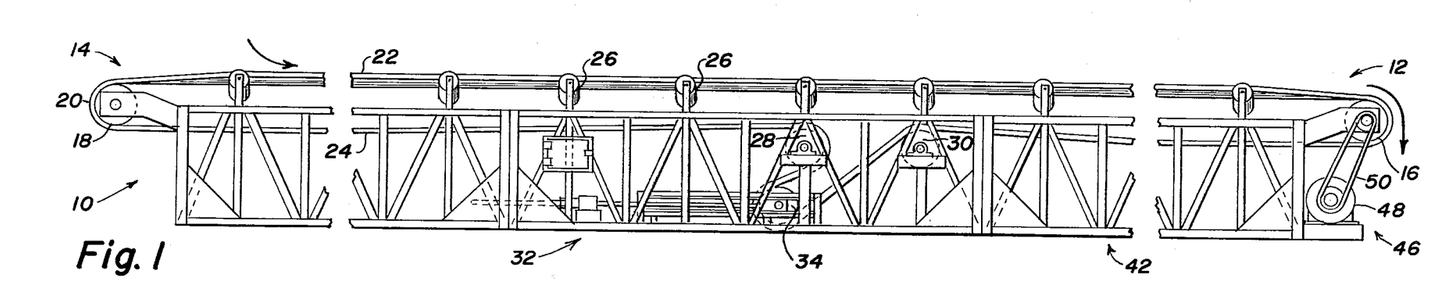
FIG. 1 is a side view of a conveyor embodying the principles of this invention, portions being broken out to indicate indeterminate length.

The conveyor mechanism of this invention is indicated generally at 10 in FIG. 1, the conveyor mechanism including a material discharging or head section indicated generally at 12 and a material receiving or tail section indicated generally at 14. The head section is provided with a drive pulley 16 and the tail section is provided with an idler pulley 18. An endless belt 20 is carried by the conveyor mechanism, the endless belt being provided with a first or upper load carrying run 22 and a second or lower return run 24. The upper run is supported by troughing roller assemblies 26 as is conventional, and, in addition, the endless belt 20 passes about the drive pulley 16 and the idler pulley 19. An intermediate section of the return run is engaged by first and second spaced apart idler pulleys 28 and 30. A further portion of the return run is engaged by a portion of the endless belt tensioning mechanism, which is indicated generally at 32. The portion of the endless belt tensioning mechanism which engages the intermediate portion of the return run of the endless belt is an idler or tensioning roller 34 which is in turn supported by a movable carriage which is indicated generally at 36. The carriage can be moved in first and second directions indicated by the arrows 38, 40, respectively, in FIG. 3. When the idler and carriage are caused to be moved in the first direction 38 the tension of the endless belt will be increased, and, alternatively, when the movable carriage and idler are moved in the direction of arrow 40 the tension on the endless belt will be decreased. The drive pulley 16, the idler pulley 18, the troughing roller assemblies 26, and the first and second idler rollers or pulleys 28 and 30 are all supported on a conveyor frame indicated generally at 42. As the manner in which the various elements referred to above are supported by the conveyor frame is not material to the present invention and is considered to be of a generally conventional design, the conveyor frame will not be described in detail with respect to these elements. In addition, the movable carriage is supported by a track structure indicated generally at 44 which will be additonally described below. The endless belt 20 is driven by the drive pulley 16 which in turn is driven by conveyor drive means indicated generally at 46, the conveyor drive means including an electric drive motor 48 mounted on the frame 42, the output of the motor 48 being interconnected to the drive pulley 16 by a drive belt or chain 50 in a generally conventional manner. The electric drive motor 48 of the conveyor drive means may be a variable speed electric motor. Alternatively, the drive belt or chain 50 may engage variable diameter sheaves whereby the speed of the conveyor may be varied in a manner well known to those having ordinary skill in the art.

The endless belt tensioning mechanism 32 further includes, in addition to the idler 34 and the carriage 36, tension adjusting means operable to move the carriage and idler in either the first direction 38 or in the second direction 40, said means being an electrically operated screw mechanism indicated generally at 52. The screw mechanism includes a reversible electric motor 54 which can operate in either a first mode or in a second mode. The electric motor is mounted on a gear reduction device 56 which in turn is mounted on a transverse frame member 58. The transverse frame member is rigidly secured to spaced apart side frame members 42a, 42b of the frame 42. The output shaft 59 of the gear reduction device 56 is coupled with a worm 60 which in turn drives a rotatable coupling 62 provided with internal threads. The coupling 62 is rotatably secured to a frame member 64 which is in turn rigidly secured to frame member 58 to prevent movement of the coupling in the direction of the arrows 38, 40. A threaded rod 66, which is partially disposed within a tube or shield 65, has an intermediate portion which passes through coupling 62 and is engaged thereby, and one end 67 of the threaded rod is interconnected to the movable carriage 36. When the motor 54 is caused to be operated in its first mode the rod 66 will be advanced in the direction of the arrow 38 relative to the frame. Alternatively, when the motor 54 is operated in its second mode the rod will be advanced in the direction of the arrow 40. The motor 54 drives the input shaft 55 of the gear reduction device 56, and in the event of a power failure that end of the shaft 55 opposite the motor 54 may be engaged by a hand crank to manually move the threaded rod 66 in either direction.

Figure 4:
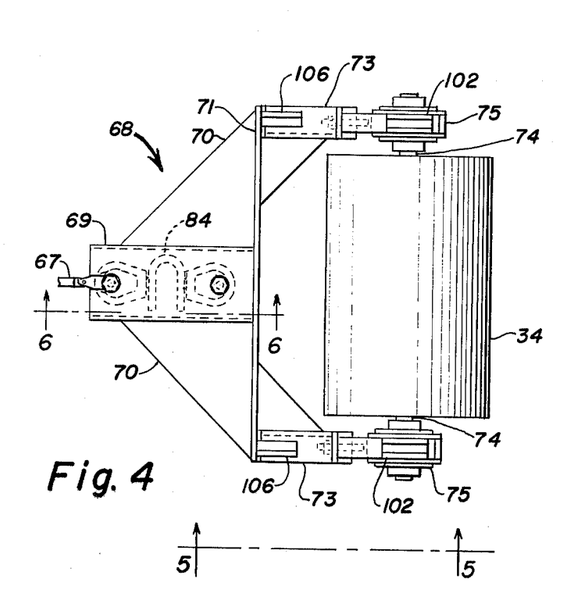
FIG. 4 is an enlarged fragmentary detail view of the idler and its supporting carriage which are shown in FIG. 3.
Figure 5:
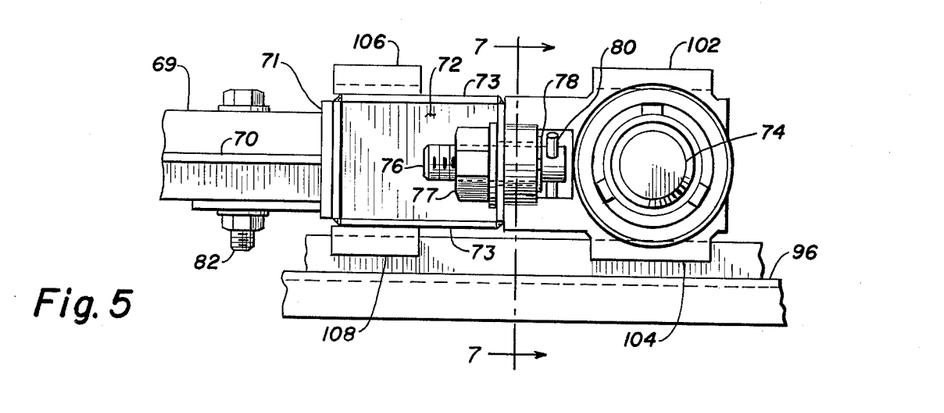
FIG. 5 is a view taken along the line 5 — 5 in FIG. 4, the idler roller being omitted for purposes of clarity, and the lower rail upon which the carriage rides being shown.
Figure 6:
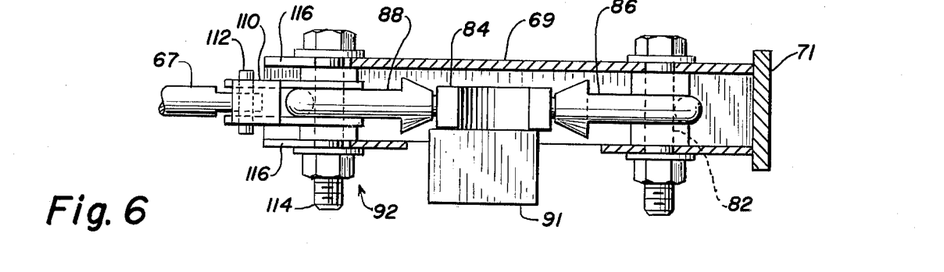
FIG. 6 is a section taken generally along the line 6 — 6 in FIG. 4.

The movable carriage includes a triangular subassembly, indicated generally at 68 in FIG. 4, the subassembly being formed of a central box beam member 69, opposed triangular gusset plates 70, and a transversely extending plate 71, the various parts all being welded to each other. Short channel sections 72 are welded or otherwise secured to opposed ends of the plate 71, with the bight portion of the channels being disposed to the side remote from the box beam member 69. Small plates 73 are welded to the upper and lower surfaces of the channel section 72. The idler or tensioning roller 34 has opposed stub axles 74 which are received in bearing block assemblies 75. Each bearing block assembly is secured to an associated channel section 72 by means of a threaded rod 76, a nut 77, and a snap ring 78. A pin 80 passes through an aperture in the rod 76 and prevents the rod from rotating when the nut 77 is being tightened. The box beam member 69 carries a vertically extending fixed shaft 82 which may be in the form of a nut and bolt assembly. One end of a tension sensing device is fixed to said shaft, and the other end is interconnected with said one end 67 of the threaded rod 66. The tension sensing means may be a "Dyna-Switch" manufactured by W. C. Dillon & Co., of Van Nuys, Calif. This device consists of a husky U-shaped flexing beam 84 and opposed mounting eyes 86, 88 which are rotatably secured to he U-shaped flexing beam member 84. The "Dyna-Switch" also includes a limit switch 90 (mounted in the enclosure 91), which, in this application, would be normally open, but which, when closed due to a reduction of the tension of the return run of the endless belt below a preselected value, would initiate operation of the electric motor 54 in its first mode in a manner which will be more clearly brought out below. The switch 90 in the "Dyna-Switch" can be set to open or close at varying loads, and forms part of the control circuit which will be described below. The mounting eye 86 is secured about the fixed shaft 82, and the mounting shaft 88 is in turn interconnected with a coupling indicated generally at 92, the coupling being in turn secured to said one end 67 of the threaded rod 66.

Figure 7:
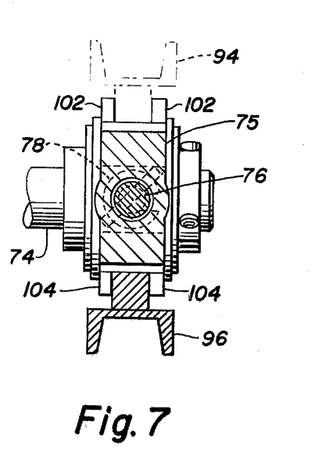
FIG. 7 is a section taken along the line 7 — 7 in FIG. 5, the upper rail being shown in phantom.

The track structure 44 includes two pair of upper and lower rails 94, 96, respectively. One pair of upper and lower rails is mounted to one side of the tensioning roller 34 and the other pair is mounted to the other side. In this connection it should be noted that vertical frame members 98, 100, (FIG. 2), are welded to the ends of the upper and lower rails 94, 96, the lower ends of the vertical rails 98, 100 being in turn rigidly interconnected to the conveyor frame 42. The bearing block assemblies are each provided with upper and lower guides 102, 104 which engage said upper and lower rails 94, 96, respectively as can best be seen in FIG. 7. In addition, the yoke structures are also provided with upper and lower guides 106, 108 which additionally engage the upper and lower rails respectively.

It should be noted at this point that if the motor 54 is operated in the first mode that the roller will be advanced in the direction of the arrow 38 as the threaded rod is caused to be moved in this direction due to the rotation of the internally threaded coupling 62, the rod acting through the coupling 92, the mounting eye 88, the flexing beam 84, the mounting eye 86, fixed shaft 82, box beam member 69, end plate 71, channel sections 72, and bearing block assemblies 74 to engage the stub shafts 74 of the roller 34 to move it in said direction. When the electric motor operates in its second mode it will move the idler in the second direction. In this connection, it should be noted that the coupling 92 is so designed that the reverse movement of the screw mechanism will not unduly compress the U-shaped flexing beam. Thus, the coupling 92 includes a box frame assembly 110, the upper and lower surfaces of which are apertured at one end to receive a vertical pin 112 which is in turn secured to one end of the rod 66, the other end of the plates 110 lying to either side of the mounting eye 88 and being apertured to receive a nut anb bolt assembly 114 which passes through the apertures in the plates, the eye of the mounting eye 88, and slots 116 in the box beam 80. Thus, when the threaded rod is advanced in the direction of the arrow 40 it will cause the bolt 114 to bear against the one end of the slots 116 to impose the reverse loading directly on the box beam member 69 which can in turn cause the idler 34 to be moved in the direction of the arrow 40.

Figure 8:
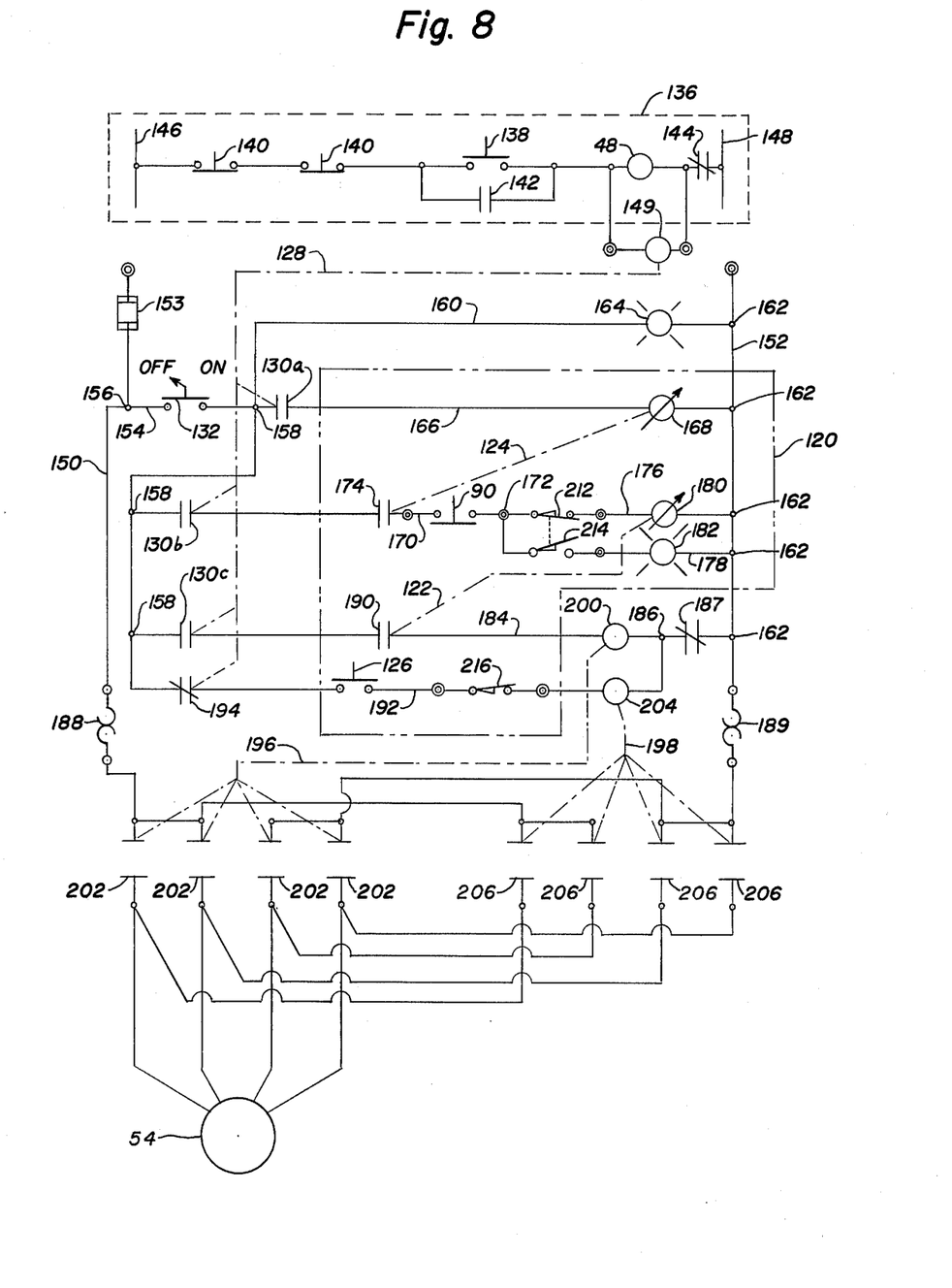
FIG. 8 is a schematic electrical diagram illustrating the manner in which the tension adjusting means is caused to be operated.

The endless belt tensioning mechanism further includes, in addition to the tension adjusting means, control circuit means indicated generally at 120 in FIG. 8. The control circuit, with the exception of the "Dyna-Switch", and other related electrical components may be mounted in an enclosure 121 which may be mounted on the frame 42 as shown in FIG. 1, or disposed in any convenient location. The control means permits movement of the idler roller in either the first direction or the second direction. In addition to the tension sensing means comprising the normally open limit switch means 90, the control means includes first means to energize the tension adjusting means after a suitable time delay, said first means including a first time delay relay indicated by the broken line 122, and second means which is operable to prevent operation of the tension adjusting means to move the idler 34 in the direction of the arrow 38 during an initial time interval during start-up of the conveyor drive means 46, said second means including a second time delay relay indicated by the broken line 124. The control means in addition includes means operable to permit energization of the motor 54 in its second mode, said means being manually operable normally open contact means 126 which may be in the form of a push button switch as shown in FIG. 8 or a toggle switch.

In addition to the control circuit means, the endless belt tensioning mechanism includes selector means. The selector means includes a conveyor drive relay indicated by the broken line 128, the relay being provided with normally open contact means 130, the noramlly open contact means 130a acting as initial contact means. In addition, a manually operable contact 132 in the form of a toggle switch or the like may also be included in the initial contact means. The conveyor drive relay further includes normally closed contact means 194 which, when closed, will permit actuation of the tension adjusting means to move the idler in the second direction.

The starter circuit for the electric drive motor 48 of the conveyor mechanism 10 is indicated generally at 136 and includes a push button starter switch 138 and one or more stop switches 140 which may be of varying constructions such as for example a push button stop, a pull cord stop, etc. The starter switch is bridged by a normally open contact 142 of the motor relay (not shown) as is conventional in the art. In addition, an overload switch 144 may be provided. Once the push button starter switch has been pushed, current will flow through the motor 48 between power lines 146, 148. The conveyor starter 136 so far described is of a conventional construction. However, it is a feature of this invention to dispose the actuator 149 of the conveyor drive relay 128 electrically in parallel with the motor 48 of the conveyor drive.

The electrical components of the tension adjusting means, the control means, and the initial contact means are disposed in various electrical lines (which will be identified later) which extend between power lines 150, 152 for the electric motor 54 which is part of the electrically operated screw mechanism 52. The power line 150 may be provided with a fuse 153. The manually operable contact 132 of the initial contact means is disposed in main line 154 which extends between a junction point 156 in power line 150 and an additional junction point 158. A first line 160 extends between junction point 158 and another junction point 162 which is disposed in the power line 152. A pilot light 164 is disposed in line 160 to indicate to the operator whether the switch 132 is open or closed, the light being on when the switch is closed. A second line 166 extends from junction point 158 to junction point 162, the second line 166 including the normally open contact means 130a of the conveyor drive relay 128 and the actuator 168 of the second time delay relay 124, the actuator 168 and the normally open contact 130a being in series. A third line extends between junction point 158 and a first intermediate junction point 172. The normally open timed delayed contact for closing 174 of the second time delay relay is disposed in line 170 in series with the normally open limit switch means 90 and normally open contact means 130b of the conveyor drive relay 128. First and second branch lines 176, 178, respectively, extend between the first intermediate junction 170 and the junction point 162. The actuator 180 of the first time delay relay 122 is disposed in line 176, and a pilot light 182 is disposed in the second branch line 178. The actuators 168 and 180 may be set for varying time periods. A fourth line 184 extends between junction point 158 and junction point 162, the fourth line 184 being provided with a second intermediate junction point 186. That portion of the line 184 which extends between junction points 186 and 162 is provided with a normally closed contact 187 of an overload relay which includes thermal overload devices 188, 189 in power lines 150, 152, respectively. The normally open timed delayed contact for closing 190 of the first time delay relay is disposed in line 184 between junction points 158 and 186 and is in series with the normally open contact means 130c of the conveyor drive relay 128. (While separate normally open contacts 130a, 130b, and 130c have been shown in FIG. 8, it should be obvious to those having ordinary skill in the art that a single normally open contact 130 could be provided in line 166 at the location of contact 130a with lines 170 and 184 extending to junction point 162 from a junction point not shown which would be located between the single normally open contact 130 and the actuator 168 of the second time delay relay.) A fifth line 192 is provided which extends between the junction point 158 and the second intermediate junction point 186, the fifth line being provided with, in series, a normally closed contact 194 of the conveyor drive relay, and the manually operable normally open contact means 126.

The tension adjusting means includes in addition to the electric motor 54 and the various other elements previously mentioned first and second motor relays indicated by the broken lines 196, 198, respectively. The actuator 200 of the first motor relay is disposed in line 184 between he junctions 158 and 186 in series with the normally open timed delayed contact for closing 190 of the first time delay relay 120 and the normally open contact means 130c of the conveyor drive relay 128. The first motor relay is further provided with normally open contact means 202 interposed in power lines 150, 152. When the normally open contact means 202 are closed the electric motor 54 will be caused to be operated in its first mode to move said idler in said first direction to take up any slack on the conveyor belt. The actuator 204 of the second motor relay is disposed in the fifth line 192 in series with the manually operable normally open contact means 126 and the normally closed contact 194 of the conveyor drive relay 128. The second motor relay 198 is further provided with normally open contact means 206 in power lines 150, 152. It should be observed that when the contacts 206 are closed the electric motor 54 will be caused to be operated in its second mode to move the idler in the second direction.

Figure 2:
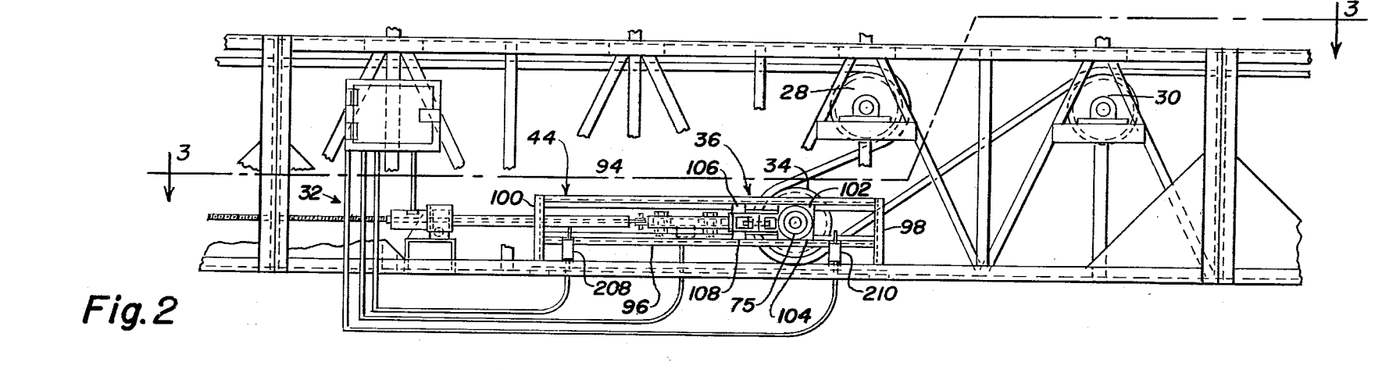
FIG. 2 is an enlarged side view of a portion of the conveyor mechanism shown in FIG. 1, this view illustrating in greater detail the belt tensioning mechanism, part of the conveyor mechanism being broken away for purposes of clarity.
Figure 3:
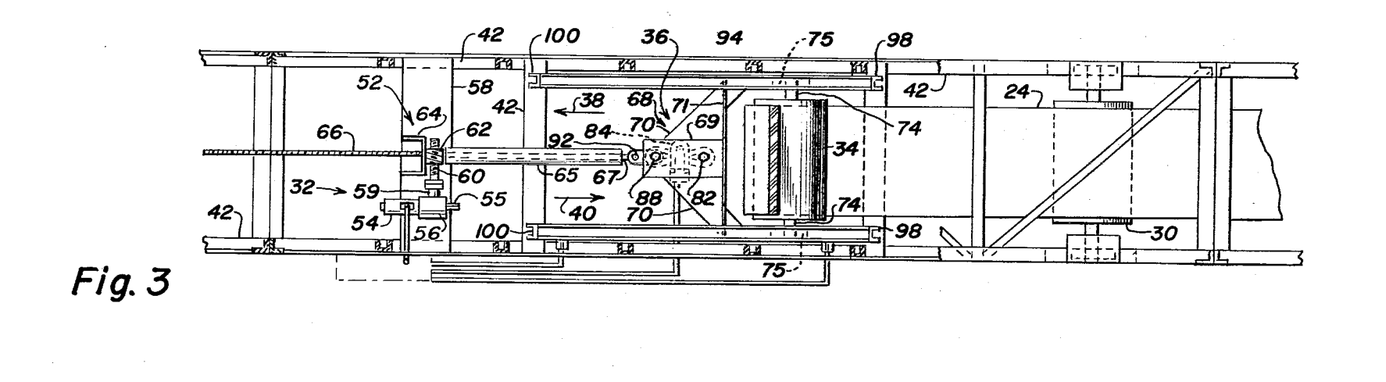
FIG. 3 is a plan view of th endless belt tensioning mechanism shown in FIG. 2.

In addition to the various elements so far described, first and second limit switches indicated generally at 208 and 210 in FIGS. 2 and 3 are provided, the first limit switch including coupled normally closed and normally open contacts 212 and 214, respectively as shown in FIG. 8. The normally closed contact 212 is in series with the actuator of the first time delay relay in the first branch line 176. The normally open contact 214 is in branch line 178 in series with the pilot light 182. The second limit switch includes a normally closed contact 216 in series with the actuator 204 of the second motor relay 198, the manually operable normally open contact means 126, and the normally closed contact 194 of the conveyor drive relay 128 in line 192.

OPERATION

When the conveyor motor 48 is started by closing the push button start switch 138 the normally open contact means 130 of the conveyor motor relay will close initiating the operation of the second time delay relay 168. After a suiable time interval the normally open timed delayed contact for closing 174 will close to permit operation of the tension sensing means 90. Thus, after the initial time period has passed, if the tension on the return run of the endless belt 20 should fall below a predetermined value the normally open limit switch means 90 would close, permitting current to flow through the actuator of the first time delay relay 122. This in turn would cause the normally open timed delayed contact for closing 190 to close after a suitable time interval which would in turn permit current to flow through the actuator 200 of the first motor relay 196. Current flow through the actuator 200 would cause the normally open contacts 202 to close to cause the electric motor 54 to operate in its first mode which would then in turn cause the idler 34 to be moved in the direction of the arrow 38 until the desired tension on the endless belt 24 is achieved. This would then cause the switch 90 to reopen resetting the time delay relay 122. If, during further operation, the tension were to fall below the preselected value the "Dyna-Switch" would again close initiating the operation of the second time delay relay. If the tension did not fall below a predetermined value for the time period for which the time delay relay has been set, as would be possible if the tension on the belt were to fall below the predetermined value only momentarily, the contact 190 would not close and therefor the operation of the take-up mechanism would not be initiated. The operation of the take-up mechanism is only possible while the conveyor drive means 48 is operating due to the conveyor drive relay 128. Thus, if the motor 48 were not in operation the contact means 130 would be in the normal open position which would prevent the operation of the time delay relays 124, 122 and the operation of the first motor relay 196. It should be noted that it is also necessary to close the contact 132 in order to permit the operation of the control means, and when the contact means 132 is closed the pilot light 164 will be on indicating the fact that the contact 132 is closed.

As previously mentioned the function of the second time delay relay 124 is to prevent the tensioning motor from hunting during initial start-up. Thus, if the normally open limit switch means 90 should close before the contact 174 of the second time delay relay has closed operation of the first time delay relay 122 and of the tensioning motor 54 will not be initiated until after the contact 174 has closed.

When the carriage 36 moves to the left (as viewed in FIGS. 1-3) it will eventually contact the first limit switch 208. This will cause the normally closed first limit switch contact 212 to open and the normally open contact 214 to close. When contact 212 opens it will interrupt current flow to the actuator 180 causing the contact 190 to open thus interrupting flow to the actuator 200 of the motor relay 196 causing contacts 202 to open, thereby prohibiting the operation of the motor 54 in its first mode. At the same time the switch 214 will close causing the pilot light 182 to go on to indicate to the operator that it is necessary to resplice the endless belt 20. Instead of or in addition to the pilot light 182 a horn or other alarm device may be provided. Also, control means may be provided, if desirable, which would shut down the feeder to the conveyor. For example, if electrically driven feeder means were employed, the actuator of a feeder relay may be disposed in branch line 178, the feeder relay having normally closed contacts interconnected with the feeder motor which would open to stop the operation of the feeder when the conveyor belt needs to be respliced.

In order to resplice the endless belt 20 it would be necessary to move the idler 34 from its extreme left hand position where the carriage contacts the first limit switch to the extreme right hand position where the carriage contacts the second limit switch 210. In order to accomplish such movement it is necessary for the operator to stop the operation of the conveyor drive means. However, in normal practice the operator will continue the operation of the conveyor drive motor 48 after the feeder for the conveyor has been shut down to discharge all material from the conveyor. At this point the operator will then stop the operation of the conveyor by opening one of the stop switches 140 which will then open the normally open contact 142 to insure that the conveyor drive means will not continue to operate. This will also cause the contacts 130a, 130b, and 130c to assume their normally open positions and the normally closed contact 194 to assume its normally closed position. If the operator then closes the manually operable normally open contact means 126 current will then flow through the actuator 204 of the second motor relay 198 to cause the contacts 206 to close. When the contacts 206 are closed the motor 54 will then be caused to be operated in its second mode to advance the idler in the second direction indicated by the arrow 40 until the carriage contacts the second limit switch 210 which will then cause the contact 216 to open. When the contact 216 is open current flow will be interrupted to the actuator 204 causing contacts 206 to open which will in turn stop the operation of the motor 54. At this time it will then be possible to resplice the endless belt 20 by taking out a section of the belt and splicing the remaining end portions of the belt together. The operation of the conveyor may now be initiated again. it should be noted that the normally closed contact 194 will be open during the operation of the conveyor thus preventing the operator from inadvertently moving the carriage in the direction of the arrow 40.

While a preferred embodiment in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A tensioning mechanism for an endless belt conveyor having a first load carrying run, a second return run, and conveyor drive means for driving said endless belt; said tensioning mechanism including:
    an idler in operative contact with the return run of the endless belt conveyor;
    tension adjusting means operatively interconnected with said idler and operative when energized in a first mode to move the idler in a first direction to increase the tension of the endless belt; and
    control means including tension sensing means for sensing the tension on the return run of the endless belt, first means operable when the tension falls below a predetermined value to permit energization of the tension adjusting means after a suitable time interval to cause said idler to be moved in said first direction, and second means operable to initiate operation of said first means only after a suitable initial time interval after start-up of said conveyor drive means whereby said tension adjusting means will not operate until after said initial time interval to prevent tension adjustment during start-up of said conveyor.

2. The tensioning mechanism set forth in claim 1 in which the tension sensing means includes normally open limit switch means adapted to close when the tension on the return run of the endless belt falls below a predetermined value.

3. The tensioning mechanism set forth in claim 2 further characterized by the provision of initial contact means operable when closed to initiate the operation of the second means, and in which the second means comprises a time delay relay having an actuator in series with said initial contact means and a normally open timed delayed contact for closing in series with said normally open tension sensing limit switch means.

4. The tensioning mechanism set forth in claim 2 in which the tension adjusting means includes an electric motor operative when energized in a first mode to move the idler in the first direction, and in which the first means operable to energize the tension adjusting means includes a first time delay relay having an actuator in a series with the normally open limit switch means of the tension sensing means and a normally open timed delayed contact for closing operative when closed to initiate operation of said electric motor in its first mode.

5. The tensioning mechanism set forth in claim 4 further characterized by the provision of an electric motor relay having an actuator in circuit with the normally open timed delayed contact for closing and normally open motor relay contact means operable when closed to initiate operation of said electric motor in its first mode.

6. A tensioning mechanism for an endless belt conveyor having a first load carrying run, a second return run, and conveyor drive means for driving said endless belt; said tensioning mechanism including:
    an idler in operative contact with the return run of said endless belt;
    tension adjusting means operatively interconnected with said idler, said tension adjusting means including an electric motor operative in a first mode to move said idler in a first direction to increase the tension of the endless belt;
    control means including a normally open tension sensing limit switch means adapted to close when the tension on the return run of the endless belt falls below a predetermined value, a first time delay relay having an actuator in series with said tension sending limit switch means and a normally open timed delayed contact for closing operative when closed to permit energization of said electric motor in its first mode after a suitable time interval to thereby cause said idler to be moved in said first direction; and a second time delay relay having a normally open timed delayed contact for closing in series with the normally open tension sensing limit switch means and an actuator; and
    initial contact means operative when closed to initiate operation of said control means, the actuator of the second time delay relay being in series with said initial contact means, the parts being so arranged and constructed that the second time delay relay will prevent energization of the tension adjusting means during an initial time interval after closing of said initial contact means.

7. The tensioning mechanism set forth in claim 6 in which said initial contact means includes normally open contact means of a conveyor drive relay having an actuator electrically in parallel with said conveyor drive means, the normally open contact means of the conveyor drive relay being closed when current flow is initiated through said conveyor drive means.

8. The tensioning mechanism set forth in claim 6 in which said electric motor is operative in a second mode to move said idler in a second direction to decrease the tension of said endless belt, and further characterized by the provision of means operable to permit energization of said electric motor in its second mode.

9. The tensioning mechanism set forth in claim 8 further characterized by the provision of a conveyor drive relay having
- an actuator electrically in parallel with said conveyor drive means;
- normally open contact means which, when closed, will permit actuation of the tension adjusting means to move said idler in said first direction only when said conveyor drive means is energized; and
- normally closed contact means which, when closed, will permit actuation of said tension adjusting means to move said idler in said second direction only when said conveyor drive means is not energized.

10. The tensioning mechanism set forth in claim 9 further characterized by the provision of a first motor relay having an actuator in circuit with the normally open timed delayed contact for closing and first normally open motor relay contact means operable when closed to initiate operation of said electric motor in said first mode, and a second motor relay having an actuator in circuit with said means operable to permit energization of said electric motor in said second mode and second normally open motor relay contact means operable when closed to initiate operation of said electric motor in said first mode.

11. A conveyor mechanism comprising:
- an endless belt conveyor having a first load carrying run, a second return run, and conveyor drive means for driving said endless belt;
- an endless belt tensioning mechanism including
  - an idler in operative contact with the return run of the endless belt,
  - tension adjusting means operatively interconnected with said idler and operative either in a first mode to move said idler in a first direction to increase the tension on the endless belt or in a second mode to move said idler in a second direction to decrease the tension of said endless belt, and
  - control means operative to permit energization of the tension adjusting means in either direction; and
- selector means operatively interconnected with the control means and the conveyor drive means to permit the tension adjusting means to move said idler in said first direction only when the conveyor drive means is operative, and to permit movement of the idler in said second direction only when the conveyor drive means is inoperative.

12. The conveyor mechanism set forth in claim 11 wherein said tension adjusting means includes an electrically operated screw mechanism selectively operable in either direction to move the idler either in the first direction or the second direction.

13. The conveyor mechanism set forth in claim 12 wherein the selector mechanism includes a conveyor drive relay having an actuator electrically in parallel with said conveyor drive means, normally open contact means and normally closed contact means, and in which said control mechanism includes tension sensing means comprising normally open limit switch means which will close when the tension on the idler falls below a predetermined level to permit operation of said electrically operated screw mechanism to advance said idler in said first direction, the normally open contact means of the control drive relay being associated with said tension sensing means, the control mechanism further including manually operable normally open contact means which, when closed, will permit operation of the electrically operated screw mechanism to advance the idler in said second direction, said manually operated contact means being in series with said normally closed contact of said conveyor drive relay.

14. The conveyor mechanism set forth in claim 11 wherein said selector means is a conveyor drive relay having
- an actuator electrically in parallel circuit with said conveyor drive means,
- normally open contact means which, when closed, will permit actuation of the tension adjusting means in said first mode to move said idler in said first direction only when said conveyor drive means is energized, and
- normally closed contact means which, when closed, will permit operation of said tension adjusting means to advance said idler in said second direction only when said conveyor drive means is not energized.

15. The conveyor mechanism set forth in claim 14 wherein said tension adjusting means include an electric motor, operative in a first mode to move said idler in said first direction to increase the tension of the endless belt and also operative in a second mode to move said idler in said second direction to decrease the tension of said endless belt; and
- further characterized by the provision of a first electric motor relay having an actuator in circuit with the normally open contact means of the conveyor drive relay and first normally open motor relay contact means operable when closed to initiate operation of said electric motor in said first mode, and a second electric motor relay having an actuator in circuit with the normally closed contact means of the conveyor drive relay and second normally open motor relay contact means operable when closed to initiate operation of said electric motor in said second mode.

16. The conveyor mechanism set forth in claim 15 in which said control means include tension sensing means for sensing the tension of the return run of the endless belt, said tension sensing means including a normally open limit switch means adapted to close when the tension on the return run of the endless belt falls below a predetermined value, first means operable when the tension falls below a predetermined value to permit energization of the electric motor after a suitable time interval to cause said idler to be moved in said first direction, and manually operable contact means in series with the normally closed contact means of the conveyor drive relay and operable when closed to permit energization of said electric motor in said second mode.

17. A conveyor mechanism comprising:
an endless belt conveyor having a first load carrying run, a second return run, and conveyor drive means for driving said endless belt;
an endless belt tensioning mechanism including
an idler in operative contact with the return run of the endless belt,
tension adjusting means operatively interconnected with said idler and operative when energized to move said idler in a first direction to increase the tension of said endless belt, and
control means including tension sensing means for sensing the tension on the return run of the endless belt, and first means operable when the tension falls below a predetermined value to permit energization of the tension adjusting means after a suitable time interval to cause the idler to be moved in said first direction to increase the tension of the endless belt; and
selector means operatively interconnected with the control means and the conveyor drive means to permit the tension adjusting means to move said idler in said first direction only when said conveyor drive means is operative, said selector means including a relay having normally open contact means in series with the tension sensing means and an actuator electrically in parallel with the conveyor drive means.

18. The conveyor mechanism set forth in claim 17 in which said control means is further characterized by the provision of second means operable to prevent energization of the tension adjusting means during an initial time interval during start-up of said drive means.

19. A conveyor mechanism comprising:
an endless belt conveyor having a first load carrying run, a second return run, and conveyor drive means for driving said endless belt;
an endless belt tensioning mechanism including
an idler in operative contact with the return run of the endless belt,
tension adjusting means operatively interconnected with said idler and operative when energized either to operate in a first mode to move said idler in a first direction to increase the tension of said endless belt or to operate in a second mode to move said idler in a second direction to decrease the tension of said endless belt, and
control means including tension sensing means for sensing the tension on the return run of said endless belt, first means operable when the tension falls below a predetermined value to energize the tension adjusting means after a suitable time interval to cause said idler to be moved in said first direction, manually operable normally open contact means which, when closed, permits energization of the tension adjusting means to cause said idler to be moved in said second direction; and
selector means operatively interconnected with the control means and the conveyor drive means to permit the tension adjusting means to move said idler in said first direction only when said conveyor drive means is operative, and to permit the tension adjusting means to move said idler in said second direction only when said conveyor drive means is inoperative.

20. The conveyor mechanism set forth in claim 19 in which said selector means includes a conveyor drive relay having an actuator electrically in parallel with said conveyor drive means, normally open contact means associated with said tension sensing means, said normally open contact means being closed only during the operation of said conveyor drive means thereby permitting said tension adjusting means to operate in its first mode only during operation of said conveyor drive means, said control drive relay further including normally closed contact means in series with the manually operable normally open contact means, said normally closed contact means being closed only when said conveyor drive means is not in operation, thereby permitting said tension adjusting means to operate in its second mode only when said conveyor drive means is inoperative.

21. A conveyor mechanism comprising:
an endless belt conveyor having a first load carrying run, a second return run, and conveyor drive means for driving said endless belt, said drive means including a drive motor;
an endless belt tensioning mechanism including
an idler in operative contact with the return run of the endless belt,
tension adjusting means operatively interconnected with said idler and operative when energized to move said idler in a first direction to increase the tension of the endles belt, and
control means including tension sensing means for sensing the tension on the return run of the endless belt, and operative when the tension falls below a preselected value to initiate operation of said tension adjusting means to cause said idler to be moved in said first direction; and
selector means including a conveyor drive relay having an actuator electrically in parallel with the conveyor drive motor, said relay further being provided with normally open contact means which will be closed during the operation of the conveyor drive means, the normally open contact means being electrically associated with said control means in such a manner that the control means will not cause the tension adjusting means to move said idler in said first direction except when the conveyor drive means is operative.

22. The conveyor mechanism set forth in claim 21 in which the control means includes normally open tension sensing limit switch means operable when closed to permit movement of said idler in said first direction, and means in series with the normally open tension sensing limit switch means and operable when said normally open tension sensing limit switch means is closed to initiate movement of the tension adjustng means after a suitable time delay, the normally open contact means of the conveyor drive relay being in series with said last mentioned means.

23. A conveyor mechanism comprising:
an endless belt conveyor having a first load carrying run, a second return run, and conveyor drive means for driving said endless belt, said drive means including a drive motor;
an endless belt tensioning mechanism including
an idler in operative contact with the return run,
tension adjusting means operatively interconnected with said idler and operative when energized to move said idler in either a first direction to increase the tension of said endless belt or in a second direction to decrease the tension of said endless belt, and control means operable to permit movement of said idler in either said first direction or said second direction; and selector means including a conveyor drive relay having an actuator electrically in parallel with said conveyor drive motor, said conveyor drive relay including normally closed contact means which, when open during the operation of said conveyor drive motor, will prohibit the actuation of the tension adjusting means to move the idler in the first direction.

24. The conveyor mechanism set forth in claim 23 in which said control means further includes manually operable normally open contact means in series with the normally closed contact of the conveyor drive relay, the parts being so arranged that when the conveyor drive motor is not in operation and said manually operable contact means is closed the tension adjusting means will be actuated to move the idler in the second direction.

25. A tensioning mechanism for an endless belt conveyor having a first load carrying run, a second return run, and conveyor drive means for driving said endless belt, said tensioning mechanism including:

a frame;

a carriage movably mounted on said frame, and an idler supported by and extending between the sides of said carriage in operative contact with the return run;

tension adjusting means operable to move said carriage in a first direction to increase the tension of said endless belt, said tension adjusting means including an electrically operated rotatable coupling provided with internal threads, and a threaded rod having a portion disclosed within said, one end of the threaded rod extending towards a midportion of said carriage; and control means operable to permit movement of said idler in said first direction, said control means including tension sensing means for sensing the tension of the return run of said endless belt, said tension sensing means extending between said one end of said threaded rod and the midportion of said carriage and including a normally open electrical switch.

26. The tensioning mechanism set forth in claim 25 in which said control means further includes delay means to initiate operation of the screw mechanism a suitable time interval after the tension on said return run has fallen below a preselected value to move said carriage in said first direction, said delay means including a first time delay relay.

* * * * *